United States Patent
Pickard et al.

(10) Patent No.: US 12,138,858 B2
(45) Date of Patent: Nov. 12, 2024

(54) SYSTEMS AND METHODS FOR CONTINUOUS FLOW CONTROL OF PRINTABLE MATERIAL IN ADDITIVE MANUFACTURING

(71) Applicant: Voltera Inc., Kitchener (CA)

(72) Inventors: James Douglas Marcel Pickard, Kitchener (CA); Jesus Zozaya, Waterloo (CA)

(73) Assignee: Voltera Inc., Kitchener (CA)

( * ) Notice: Subject to any disclaimer, the term of this patent is extended or adjusted under 35 U.S.C. 154(b) by 488 days.

(21) Appl. No.: 17/237,583

(22) Filed: Apr. 22, 2021

(65) Prior Publication Data

US 2021/0339471 A1  Nov. 4, 2021

Related U.S. Application Data

(60) Provisional application No. 63/018,709, filed on May 1, 2020.

(51) Int. Cl.
*B29C 64/209* (2017.01)
*B29C 64/106* (2017.01)
(Continued)

(52) U.S. Cl.
CPC .......... *B29C 64/209* (2017.08); *B29C 64/106* (2017.08); *B29C 64/386* (2017.08);
(Continued)

(58) Field of Classification Search
CPC .............. G01L 7/082; G01L 7/08; G01L 7/02
See application file for complete search history.

(56) References Cited

U.S. PATENT DOCUMENTS 3,818,765 A * 6/1974 Eriksen ............... G01L 19/0645
73/706
3,939,758 A * 2/1976 Faisandier ............ H01H 35/34
200/83 W (Continued)

FOREIGN PATENT DOCUMENTS

EP         2607875 A1       6/2013
GB          159168 A  *    1/1922 ........... A61B 5/0215
KR      20190059433 A  *    5/2019

OTHER PUBLICATIONS

Espacenet Machine Translation of EP 2607875 A1 Which Originally Published On Jun. 26, 2013. (Year: 2013).*

*Primary Examiner* — Tran M. Tran
(74) *Attorney, Agent, or Firm* — Own Innovation Inc.; James W. Hinton; Kent C. Howe (57) ABSTRACT

Provided is a print head, a system and method for pressure measurements and continuous control of a flowable material in a flow path. The system includes a pressure coupler comprising a body having a channel through the longitudinal center of the body, the channel spanning between a first opening and a second opening. The pressure coupler includes a membrane embedded in the body, wherein the membrane is contiguous with, and forms a region of, the channel. Material flowing through the channel imparts a force on the membrane, and the force is transferred from the membrane to a pressure sensor adjacent to the pressure coupler. The pressure coupler and sensor may be included in a print head, whereby the pressure of a flowable material is measured during dispensing from the print head. The pressure measurements are used for continuous feedback flow control of the flowable material through the flow path.

5 Claims, 11 Drawing Sheets

(51) Int. Cl.
*B29C 64/386* (2017.01)
*B33Y 10/00* (2015.01)
*B33Y 30/00* (2015.01)
*B33Y 50/00* (2015.01)
*G01L 19/00* (2006.01)

(52) U.S. Cl.
CPC .............. *B33Y 10/00* (2014.12); *B33Y 30/00* (2014.12); *B33Y 50/00* (2014.12); *G01L 19/0023* (2013.01)

(56) References Cited

U.S. PATENT DOCUMENTS

| | | | | |
|---|---|---|---|---|
| 3,946,724 A * | 3/1976 | La Balme | .......... | A61N 1/36564 73/726 |
| 4,034,610 A * | 7/1977 | Biddle | .................... | G01L 9/006 73/725 |
| 4,554,927 A * | 11/1985 | Fussell | .................... | G01L 9/065 73/714 |
| 4,555,952 A * | 12/1985 | Jenkins | ................. | G01L 9/0072 73/861.47 |
| 4,886,070 A * | 12/1989 | Demarest | .............. | G01L 27/002 600/561 |
| 4,923,444 A * | 5/1990 | Daoud | .............. | A61M 5/16854 604/246 |
| 4,950,244 A * | 8/1990 | Fellingham | ....... | A61M 5/16854 73/726 |
| 5,257,630 A * | 11/1993 | Broitman | .............. | G01L 27/005 338/42 |
| 5,554,115 A * | 9/1996 | Thomas | .................. | G01L 9/006 128/DIG. 13 |
| 5,644,285 A * | 7/1997 | Maurer | ............... | G01L 19/0038 338/42 |
| 5,744,726 A * | 4/1998 | Maurer | ............... | G01L 19/0023 73/756 |
| 5,993,395 A * | 11/1999 | Shulze | ................. | A61B 5/0215 73/706 |
| 6,168,566 B1 * | 1/2001 | Lia | .......... | G01L 7/082 600/561 |
| 6,695,789 B2 * | 2/2004 | Thede | .................... | A61B 5/681 600/490 |
| 7,267,011 B2 * | 9/2007 | Voto | .................... | A61M 1/3641 73/715 |
| 7,856,887 B2 * | 12/2010 | Klees | .................... | G01L 9/0026 73/756 |
| 7,891,251 B2 * | 2/2011 | Henes | .................... | G01L 15/00 73/706 |
| 8,016,744 B2 * | 9/2011 | Dlugos | .................... | A61B 5/03 606/151 |
| 8,025,623 B1 * | 9/2011 | Millar | .................... | A61B 5/036 600/488 |
| 9,032,805 B2 * | 5/2015 | Wakeman | ............... | G01L 19/10 116/273 |
| 9,164,008 B2 * | 10/2015 | Fukano | .................... | G01L 7/08 |
| 9,188,500 B2 * | 11/2015 | Pezzin | .................... | G01L 23/00 |
| 9,823,151 B2 * | 11/2017 | Stokes | .................... | G01L 19/14 |
| 9,933,288 B2 * | 4/2018 | Imai | ....................... | G01F 1/383 |
| 10,091,891 B2 * | 10/2018 | Ilic | .................... | H05K 13/0469 |
| 10,222,286 B2 * | 3/2019 | Imai | .................... | G01L 19/147 |
| 10,414,092 B2 * | 9/2019 | Ilic | .................... | B29C 64/106 |
| 10,852,166 B1 * | 12/2020 | Huntzinger | ......... | G01L 19/0023 |
| 10,948,110 B2 * | 3/2021 | Panagotopulos | ....... | F16L 49/06 |
| 11,656,141 B2 * | 5/2023 | Benslimane | .......... | G01L 9/0052 73/707 |
| 2020/0191673 A1 * | 6/2020 | Wu | .................... | G01L 19/14 |
| 2023/0135371 A1 * | 5/2023 | Fu | .................... | G01L 9/0041 73/715 |

\* cited by examiner

SYSTEMS AND METHODS FOR CONTINUOUS FLOW CONTROL OF PRINTABLE MATERIAL IN ADDITIVE MANUFACTURING

TECHNICAL FIELD

The embodiments disclosed herein relate generally to fabrication systems, such as circuit printing systems, and, in particular to an interchangeable pressure coupler and print head for use in such systems.

INTRODUCTION

The production of various objects and prototypes of objects, such as printed circuit boards (PCBs), can require the implementation of a variety of processing steps and material applications. Each such process and material application may require the use of different materials and tools for fabricating the object or prototype. Such varying combinations of tooling and materials can therefore require significant investments in equipment, or the use of costly and time-consuming third-party fabrication services.

Additive processes for fabricating circuit boards have drawn attention in the field of rapid prototyping. Unlike subtractive processes, additive techniques can offer the advantage of being virtually unrestricted in layer count due to the fact that material is used as it is needed. Furthermore, since material is added and not removed, there is generally less waste than within subtractive processes. Presently, additive manufacturing techniques with respect to conductive patterning on a base material have been primarily focused around inkjet printing. Inkjet printing technologies can achieve high resolution performance by tightly controlling the ink's rheology and ensuring that the ink is relatively free of contaminants. The micro-nozzles, from which the printing fluid is ejected can be prone to contaminant buildup. This can be particularly true for conductive fluids. As the conductive ink is exposed to air at the nozzle opening, the solvent evaporates and can leave behind metallic residue around the nozzle. This residue can cause the micro-drops to be ejected at sharp angles or can even clog the nozzle entirely.

Unlike conductive inks used in inkjet printing, conductive Polymer Thick Film (PTF) pastes use higher viscosities and are therefore not primarily made of solvents. Polymeric materials, such as epoxy resin, typically act as the base in which metallic particles are suspended. A conductive PTF paste is typically composed of about 40% to about 98% metallic nano or micro particles, and the remaining about 2% to about 60% is polymeric material and additives. The combination of high solid content and polymeric material usually gives these screen printing pastes thixotropic properties and much higher viscosities of, for example, about 20 KcP to about 200 KcP. These higher viscosities can allow the pastes to hold their shape once printed which in turn allows fine features to be printed on the desired material. In addition, traces created by conductive PTF pastes are typically much taller than the sub-micron traces printed by inkjet applications. This increased cross-sectional area, along with the high metallic content, can provide improved conductivity and solderability over conductive inks utilized in inkjet printing.

The thixotropic nature of PTF pastes cause their viscosity to change with respect to an applied shear force. When a substantially downward force, F, is applied on enclosed thixotropic materials during dispensing, the shear component of the force can decrease the viscosity of the materials. This decrease can be beneficial for dispensing since a drop in viscosity can cause the enclosed materials to flow more readily out of the nozzle, and onto the substrate material. However, if the viscosity of the enclosed materials is too low it can cause undesirable spreading on the substrate material, hence it can create poorly resolved dispensed traces.

To a person skilled in the art it will now be apparent that, throughout dispensing, the magnitude and duration of the substantially downward force, F, directly influences the viscosity of the enclosed materials, and hence the fluid flow out of the nozzle. Therefore, the duration and magnitude of the substantially downward force, F, can be controlled to consecutively modulate the dispensing characteristics of the enclosed materials. However, other factors, for example, the adhesion between the material and the inner surface of the nozzle or residue buildup in the nozzle also influences the flow of the material. Thus, fine tuning of control in dispensing enclosed materials must take into account not only the substantially downward force, F, but also the actual force (i.e. pressure) experienced by the material as it flows.

Accordingly, there is a need for improved systems and methods for actively measuring the pressure of a thixotropic material at or near the point where the material is dispensed from a nozzle. The measured pressure can then be used in a feedback control loop to actively modulate the dispensing characteristics of the enclosed material.

SUMMARY

According to an embodiment, a system for measuring the pressure of a material flowing through a flow path is provided. The system comprises a pressure coupler and a pressure sensor that is removable from the pressure coupler. The pressure coupler comprises a body having a first opening and a second opening. The body may be constructed of metal or plastic. A channel spanning the first and the second opening, passes through the center of the body. The channel has a larger diameter at the first opening and a smaller diameter at the second opening. A membrane constructed of an inert elastomer is embedded within the body. The membrane is contiguous with, and forms a region of, the channel such that material flowing through the channel imparts a force on the membrane in a substantially perpendicular direction to the direction of material flow.

The pressure sensor comprises a pressure sensing element and a metal pin. A first end of the metal pin contacts the pressure sensing element and a second end of the metal pin contacts the membrane such that the force imparted on the membrane is transferred to the pressure sensing element via the metal pin. According to an embodiment, the pressure coupler further comprises a male Luer lock connection formed around the second opening.

According to an embodiment, a print head for additive manufacturing is provided. The print head comprises a print head housing. The print head housing includes a recess for receiving the pressure coupler. When inserted into the recess, the first opening of the pressure coupler is positioned within the print head housing and the second opening extends outside the print head housing. The print head housing includes a platform having an opening. The print head housing includes a pressure sensor positioned adjacent to the recess. The pressure sensor contacts the membrane of the pressure coupler. The print head comprises a nozzle adapted to removably attach to the second opening.

The print head further comprises a syringe pre-loaded with a printable material. The syringe includes a tube having a male Luer slip taper, and piston within the tube for dispensing material out of the tube through the male Luer slip taper. The syringe is removably inserted into the print head housing through the opening in the platform such that the first opening in the pressure coupler receives the male Luer slip taper. The print head housing may further comprise a cutout for viewing the syringe.

The print head housing comprises a dispensing control unit having a plunger. The dispensing control unit is removably attached to the print head housing, wherein the plunger inserts into the syringe to engage the piston. The plunger includes a plunger head. The plunger head includes an O-ring held between a retaining flange and a beveled flange, wherein the beveled flange compresses the O-ring against the syringe to form a seal when the plunger travels upward in the syringe, and wherein the retaining flange releases the O-ring when the plunger moves downward in the syringe thereby removing the seal. The plunger head includes a tapered end for contacting the piston. The tapered end is shaped to exert downward and outward force on the piston when the plunger engages the piston.

The dispensing control unit may include a stepper motor for driving the plunger. According to an embodiment, the dispensing control unit may include a locking flange and the print head housing includes a locking slot, wherein the locking flange engages the locking slot when the dispensing control unit is removably attached to the print head housing.

According to an embodiment, a method for controlling the flowable material through a flow path is provided. The flowable material may be a thixotropic material. The method comprises: displacing a plunger, wherein displacement of the plunger causes movement of a flowable material through a flow path; measuring a pressure of the flowable material at a point in the flow path downstream of the plunger and proximate to an outlet of the flow path; comparing the measured pressure and a target pressure; adjusting the displacement of the plunger to reduce the difference between the measured pressure and the target pressure; and confirming flow of the flowable material based on displacement of the plunger.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Figure 1A:
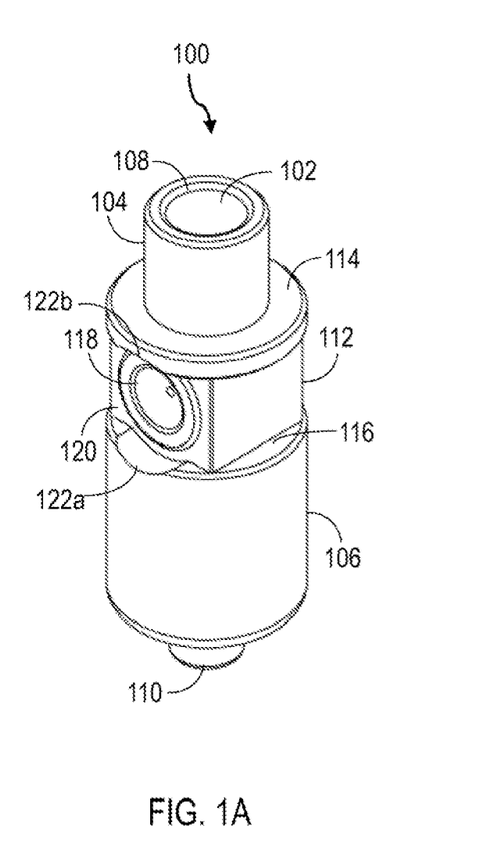
FIG. 1A is a perspective view of an interchangeable pressure coupler, according to an embodiment.
Figure 1B:
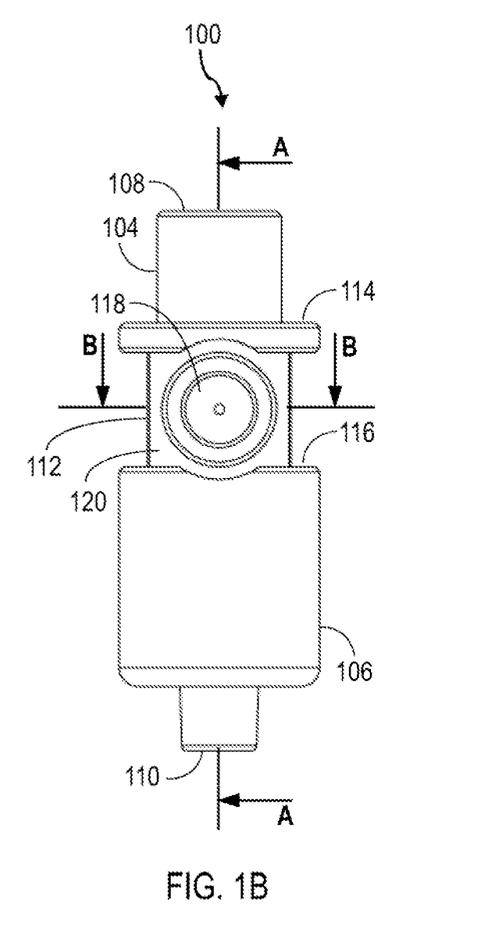
FIG. 1B is a front view of the interchangeable pressure coupler shown in FIG. 1A.

Referring to FIGS. 1A and 1B, illustrated therein is an interchangeable pressure coupler 100, in accordance with an embodiment. The pressure coupler 100 is generally cylindrical in shape having a channel 102 running through the longitudinal center of the pressure coupler 100. The pressure coupler 100 may be constructed of metal or plastic. The pressure coupler 100 includes an inlet section 104 and an outlet section 106. The inlet section 104 includes a female Luer slip opening 108 for receiving a complimentary male Leur slip taper of a syringe (not shown). The outlet section 106 includes a male Luer lock opening 110 for connecting to dispensing nozzles having a complimentary female Luer lock. The channel 102 runs between the openings 108, 110.

The pressure coupler 100 includes a midsection 112 between the inlet section 104 and the outlet section 106. The interface between the inlet section 106 and the midsection 112 is a flange 114 that overhangs both inlet section 106 and the midsection 112. The interface between the midsection 112 and the outlet section 106 is a ledge 116 that forms the top of the outlet section 106 and overhangs the midsection 112. The midsection 112 is four-sided and substantially cube, whereas, the inlet section 106, the outset section 106 and the flange 114 are cylindrical. According to other embodiments, the midsection 112 may be shaped differently to allow the pressure coupler 100 to fit snugly into a housing (not shown). The midsection 112 includes a circular dimple 118 in a surface 120 of the midsection 112.

Figure 1C:
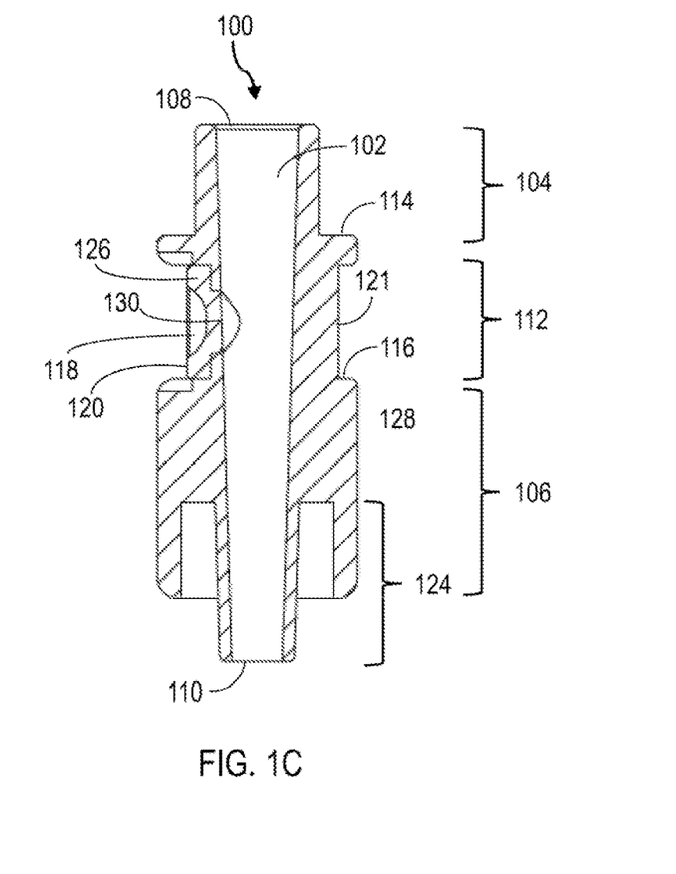
FIG. 1C is a side cross-sectional view through section A-A of the interchangeable pressure coupler shown in FIG. 1B.
Figure 1D:
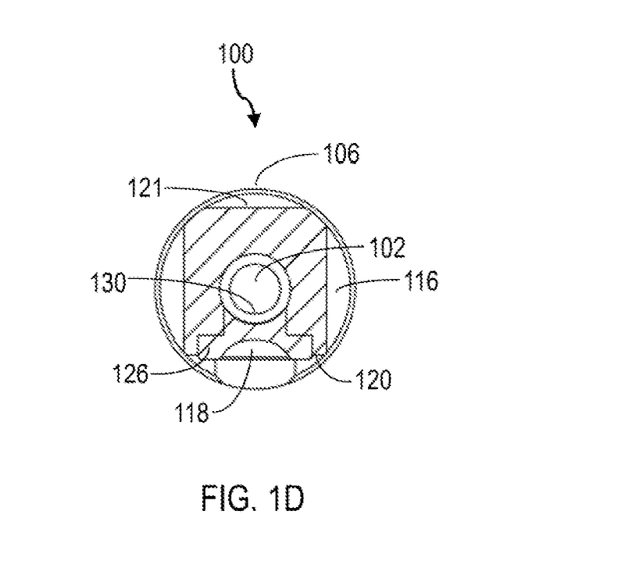
FIG. 1D is top cross-sectional view through section B-B of the interchangeable pressure coupler shown in FIG. 1B.

Referring to FIGS. 1C and 1D, illustrated therein are sectional views of the interchangeable pressure coupler 100. FIG. 1C is a side cross-section through section A-A in FIG. 1B. FIG. 1D is a top cross-section through section B-B in FIG. 1B. The channel 102 has a larger diameter at the inlet section 104 and tapers to a smaller diameter at the outlet section 106. The inlet section 104 includes a female Luer slip opening 108 for receiving the tip of a syringe (not shown) having a complimentary male Luer slip taper. The outlet section 106 includes a male Luer lock connection 124 for connecting the pressure coupler 100 to a nozzle (not shown) having a complimentary female Luer lock opening. According to other embodiments, the outlet section 106 may include another taper 124 or connective means for connecting to other complimentary nozzles.

The pressure coupler 100 includes a flexible membrane 126. The membrane 126 is contiguous with the dimple 118 in the surface 120 of the midsection 112. The membrane 126 is also contiguous with, and partially envelops, the channel 102 thereby forming a portion of the channel wall 130. The membrane 126 is made of a chemically inert fluoroelastomer, for example, FKM.

Referring now to FIG. 1C, when material flows through the channel 102, the inner walls of the channel 102 will experience outward pressure as the material within the channel 102 is pressurized. Pressure applied to wall 130 of the channel 102 results in a Force, F, which is transferred from the side of the membrane 126 that is contiguous with the wall 130 to the side of the membrane that is contiguous with the dimple 118. Generally, an increase in the rate of material flow corresponds to an increase in the pressure experienced by the material and a corresponding increase in the force, F, exerted on the wall 130 of the channel 102.

Figure 2A:
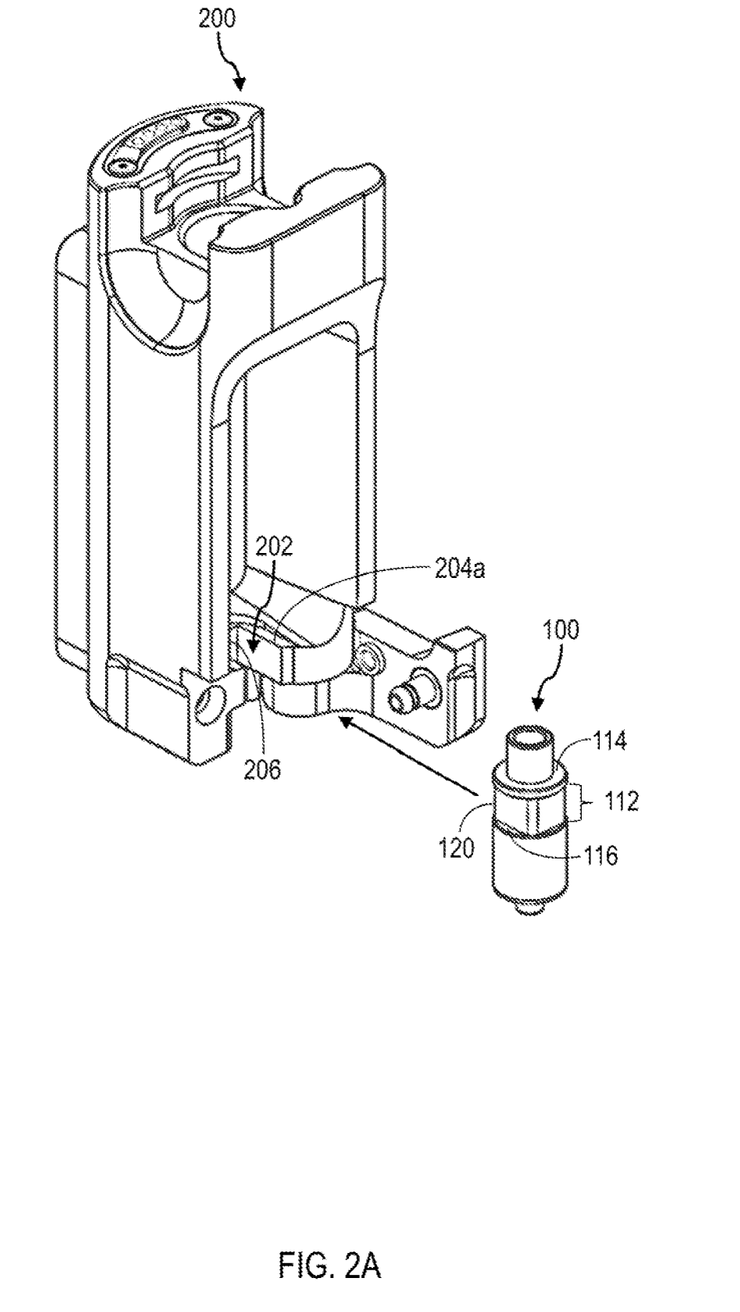
FIGS. 2A-2C are perspective views of the interchangeable pressure coupler of FIG. 1A shown in relation to a print head housing, according to an embodiment.

Referring to FIG. 2A, illustrated therein is a print head housing 200 shown in relation to the interchangeable pressure coupler 100. The print head housing 200 includes a recess 202 for receiving the pressure coupler 100. The recess 200 includes two opposable side walls 204a, 204b, of which one side wall 204a is shown. When the pressure coupler 100 is inserted into the print head housing 200, the side walls 204a of the recess 202 contact the midsection 112 of the pressure coupler 100 such that each side wall 204a is positioned between the flange 114 and ledge 116 of the pressure coupler 100. According to other embodiments, the recess 202 may contact the pressure coupler 100 through alternative means, for example, by use of complimentary magnets in the recess 202 and the pressure coupler 100.

The recess 202 includes a back wall 206. The back wall 206 contacts the surface 120 of the midsection 112 and when the pressure coupler 100 is inserted into the print head housing 200. As described in more detail below, the back wall 206 of the recess 202 includes a metal pin (not shown). When the pressure coupler 100 is inserted into the housing 200, the metal pin contacts the dimple (i.e. dimple 118 in FIGS. 1A-1D) in the membrane (i.e. membrane 126 in FIGS. 1C-1D).

Figure 2B:
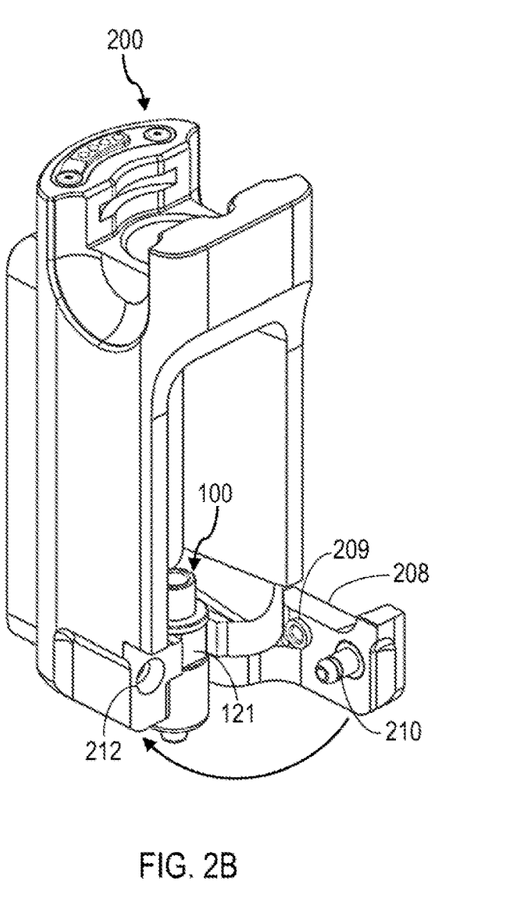
Figure 2C:
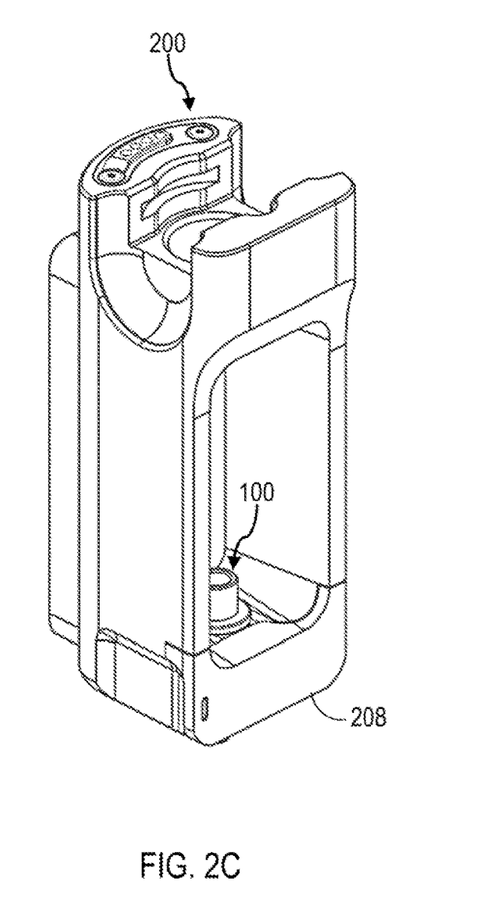

Now referring to FIGS. 2B and 2C, illustrated therein is the pressure coupler 100 shown inserted into the print head housing 200. The housing 200 includes a pivotable arm 208 to removably secure the pressure coupler 100 in the housing 200. The arm 208 is pivotable between an open position (FIG. 2B) and a closed position (FIG. 2C). The arm 208 includes a ball spring 209. The ball spring 209 rests against a surface 121 of the pressure coupler 100 when the arm 208 is in the closed position, thereby maintaining the position of the pressure coupler 100 in the recess (i.e. recess 202 in FIG. 2A). To maintain the arm 208 in the closed position, the arm 208 includes a latch pin 210. The latch pin 210 fits into a circular canted coil spring embedded within aperture 212 on housing 200 when the arm 208 is in the closed position. According to other embodiments, the arm 208 may be maintained in the closed position through alternative means, for example, a thumb screw and catch.

Figure 3A:
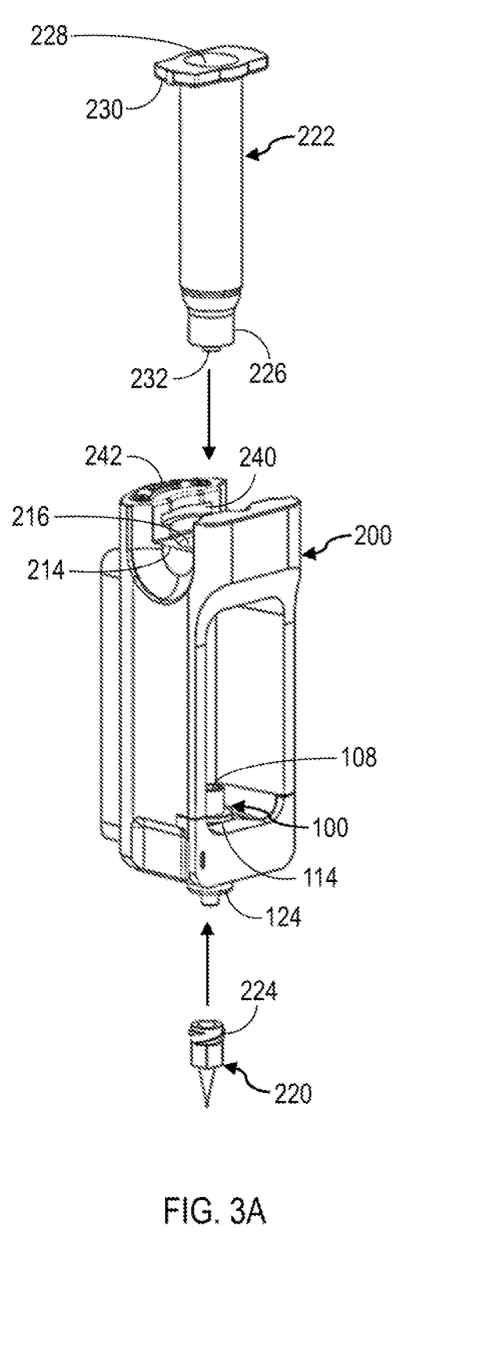
FIG. 3A is a perspective view of the interchangeable pressure coupler and print head housing of FIG. 2C shown in relation to a nozzle and a syringe, according to an embodiment.

Referring to FIG. 3A illustrated therein is the pressure coupler 100 inserted into the print head housing 200 as shown in FIG. 2C. The pressure coupler 100 and print head housing 200 are shown in relation to a nozzle 220 and a syringe 222. The nozzle 220 includes a female Luer lock 224 for removably attaching the nozzle 220 to the male Luer lock 124 of the pressure coupler 100. The syringe 222 includes an male Luer taper 226, an adaptor sheath 232, a top opening 228 and a lip 230. The syringe 222 is preferably pre-filled with a material for circuit board printing. For example, the syringe 222 may be filled with a conductive PTF paste. The print head housing 200 includes a recess 240, electrical contact pins 242, a platform 214 and an opening 216 for receiving the syringe 222. When the syringe 222 is inserted into the print head housing 200, the male Luer taper 226 inserts into the tapered inlet of the pressure coupler until the tapered walls meet. Installing the dispensing control unit wedges the tapered surfaces of the syringe and coupler together creating a tight seal.

Figure 3B:
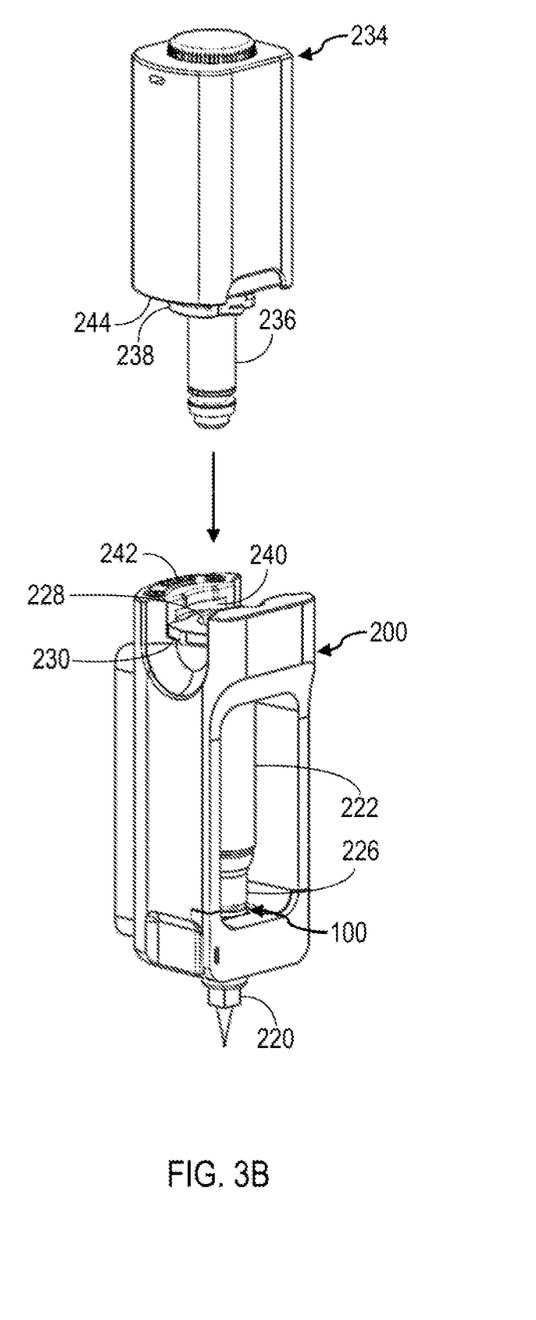
FIG. 3B is a perspective view of the components of FIG. 3A shown in relation to a dispensing control unit, according to an embodiment.

Referring to FIG. 3B illustrated therein is the pressure coupler 100, the print head housing 200, the nozzle 220 and the syringe 222 of FIG. 3A shown assembled and in relation to a dispensing control unit 234. The dispensing control unit 234 includes a plunger 236 for dispensing material contained in the syringe 222. When the dispensing control unit 234 is attached to the print head housing 220 (containing the syringe 222), the plunger 236 inserts into the opening 228 in the syringe 222. The dispensing control unit 234 includes a flange 238 attached to a bottom surface 244 of the control unit 234. The dispensing control unit 234 includes a stepper motor (not shown) for controlling the upward and downward movement of the plunger 236 and therefore also modulating the dispensing of material contained in the syringe 222 through the nozzle 220. The dispensing control unit 234 includes electrical contact pins (not shown) on the bottom surface 244. The electrical contact pins connect with complementary contact pins 242 on the print head housing 200 when the dispensing control unit 234 is attached to the print head housing 200.

Figure 3C:
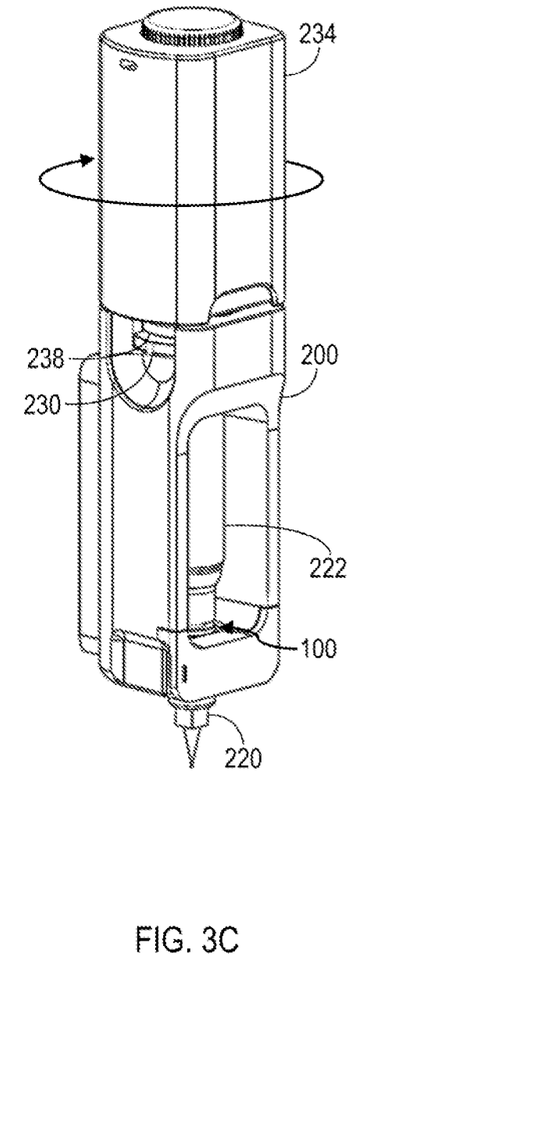
FIGS. 3C and 3D are perspective views of the components of FIG. 3B assembled to form a print head, according to an embodiment.

Referring to FIG. 3C, illustrated therein is the dispensing control unit 324 shown inserted into the print head housing 200 containing the syringe 222. When the dispensing control unit 234 is lowered onto the print head housing 220, the flange 238 of the dispensing control unit 234 rests on the lip 230 of the syringe 222. To complete assembly, the dispensing control unit 234 is rotated ninety (90) degrees counterclockwise with respect to the print head housing 200 resulting in a fully assembled print head 250 shown in FIG. 3D. Rotation of the dispensing control unit 234 causes the flange 238 of the dispensing control unit 234 to fit into the recess 240 in the print head housing 200 (see FIG. 3B) effectively locking the syringe 222 into the print head housing 200 and reversibly attaching the dispensing control unit 234 to the print head housing 200. Rotation of the dispensing control unit 234 also aligns the electrical contact pins on the bottom surface 244 of the dispensing control unit 234 to the complimentary contact pins 242 on the print head housing 200 (see FIG. 3B). According to other embodiments, the dispensing control unit 234 may be removably attached to the print head housing 200 by other means, for example, by use of magnets.

Figure 3D:
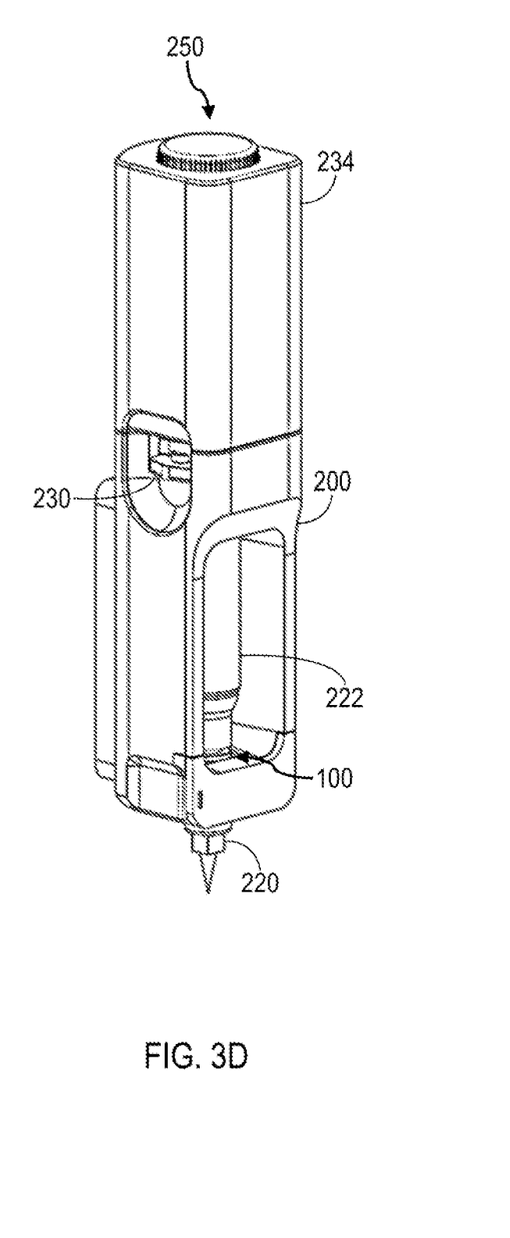

An advantage of print head 250 is that different printable materials may be dispensed using the same print head housing 200 and dispensing control unit 234 by replacing the syringe 222 with another syringe 222 containing a different material. Furthermore, the pressure coupler 100 and nozzle 220 may be switched along with the syringe 222 to avoid cross-contamination between different printable materials. Alternatively, the pressure coupler 100 and nozzle 220 may be flushed with cleaning reagent when the syringe 222 is replaced. Thus, the ability of the print head 250 to dispense different printable materials with minimal changes to the print head 250 (i.e. replacing only the desired components while maintaining the others) offers flexibility and convenience to users. A further advantage is that individual components that become clogged by residue build-up can be replaced as needed.

Figure 3E:
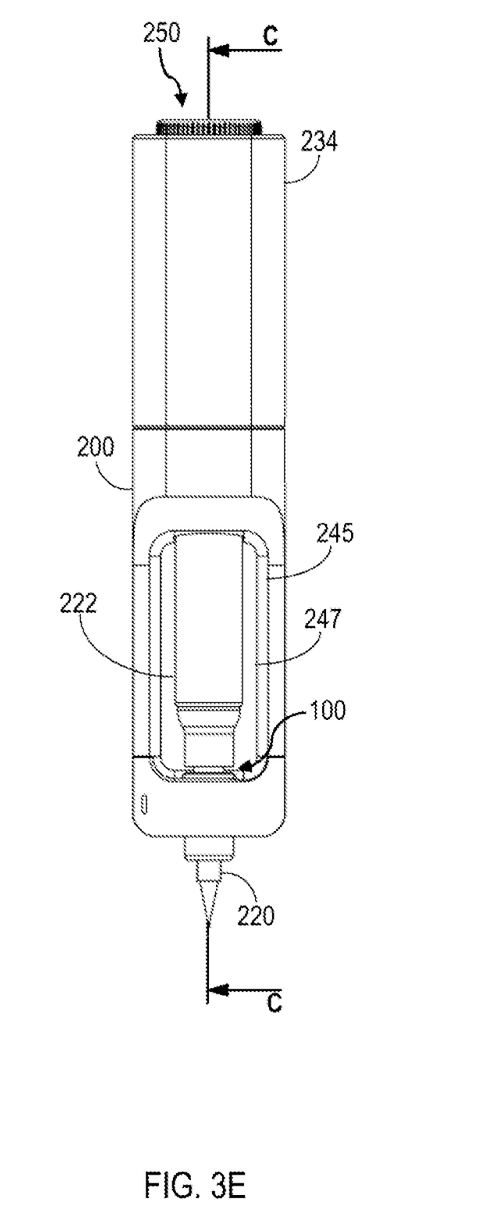
FIG. 3E is a front view of the print head shown in FIG. 3D.

Now referring to FIG. 3E, illustrated therein is the assembled print head 250, according to an embodiment. The print head housing 200 includes a cutout 245 through which the syringe 222 can be viewed. The cutout 245 is advantageous to monitor the amount of material remaining in the syringe 222 as well as for inspecting the print head 250 for troubleshooting purposes. The print head housing 200 includes a back panel 247. The back panel 247 may be backlit (e.g. by LEDs) to further aid in viewing the material in the syringe 222 and to display the current status of the print head 250. According to an embodiment, the back panel 247 includes a barcode reader for reading a barcode that is encoded on the syringe 222. The barcode corresponds to the material in the syringe 222 and may thus be used for identifying which material is contained within the syringe 222 loaded in the print head 250 to ensure that the correct dispensing parameters are used.

Figure 3F:
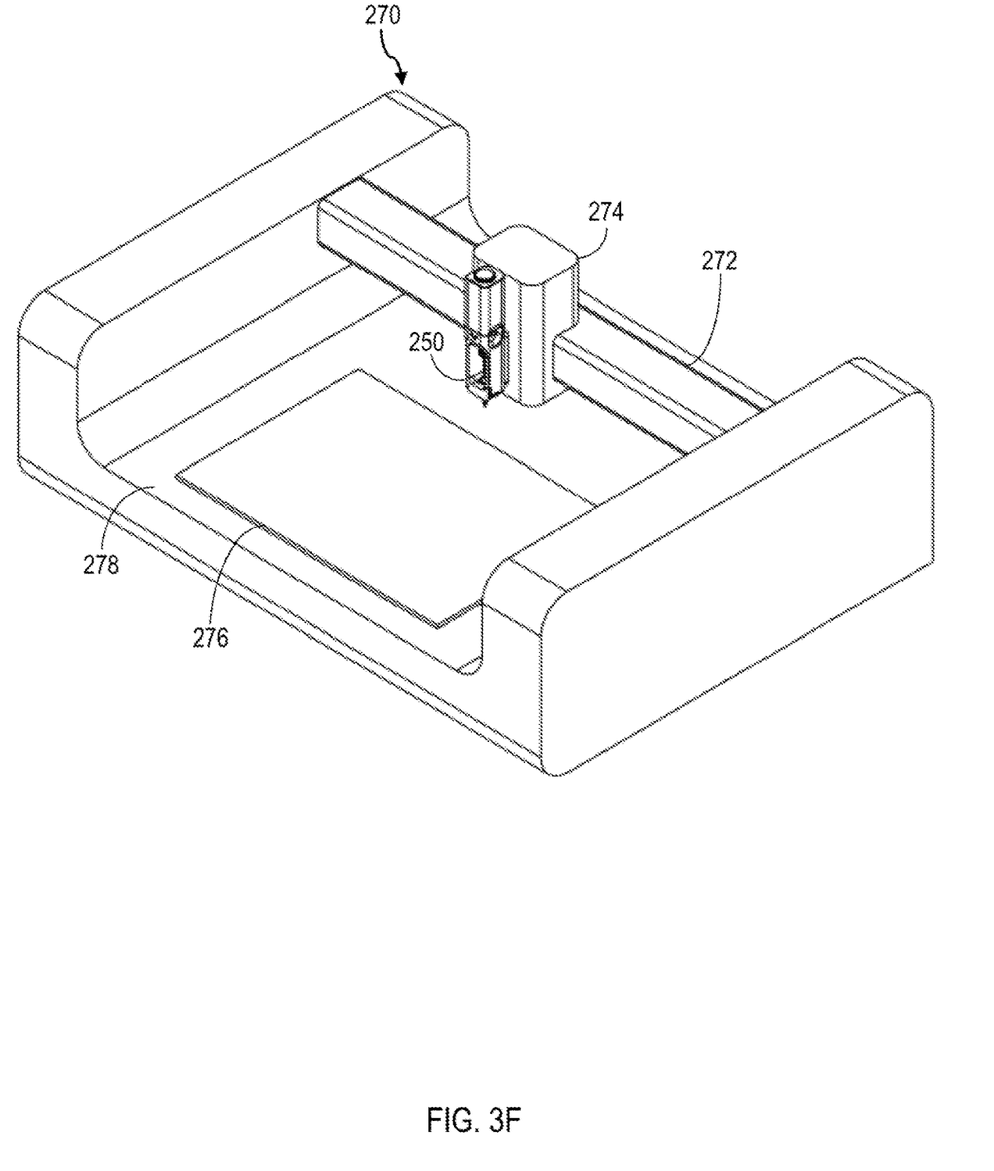
FIG. 3F is a perspective view of the print head in FIG. 3E, shown in relation to a printer chassis.

Referring to FIG. 3F, illustrated therein is the assembled print head 250 of FIG. 3E shown in relation to a printer chassis 270. The printer chassis 270 includes a stage 278 on which a substrate material 276 is positioned for printing. The printer chassis 270 includes a gantry system 272 for moving the print head 250 in coordinated X, Y, Z directions to deposit printable material onto the substrate material 276. The gantry system 272 includes a print head holder 274 for removably attaching the print head 250 to the printer chassis 270. Attachment of the print head 250 to the print head holder 274 may be achieved, for example, by the use of magnets on the print head 250 and the print head holder 274. The print head holder 274 includes electrical contacts (not shown) that connect to complimentary contacts on the print head 250 for controlling the dispensing of material.

Figure 4A:
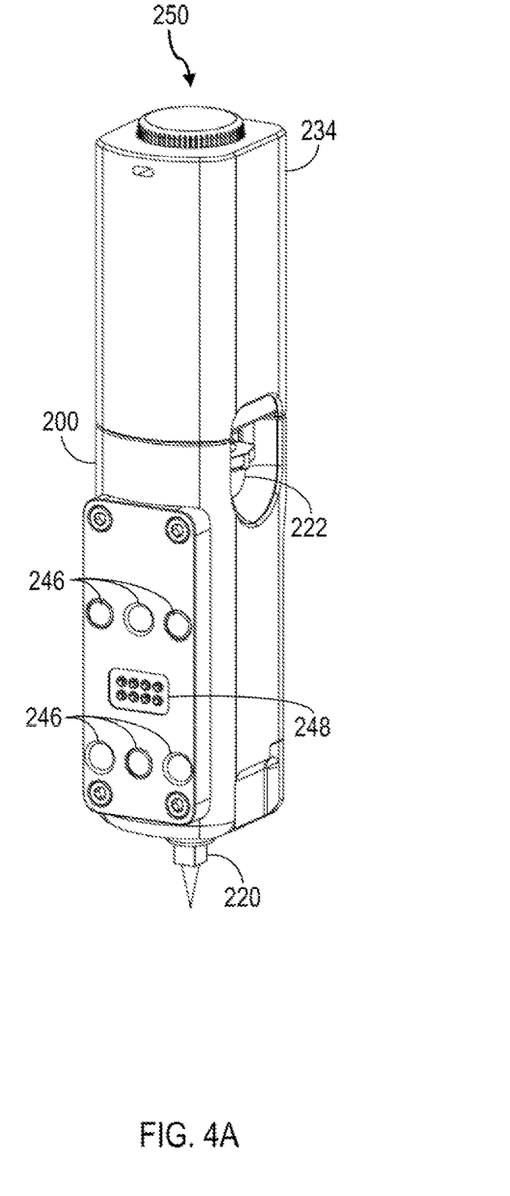
FIG. 4A is a rotated perspective view of the print head shown in FIG. 3D.
Figure 4B:
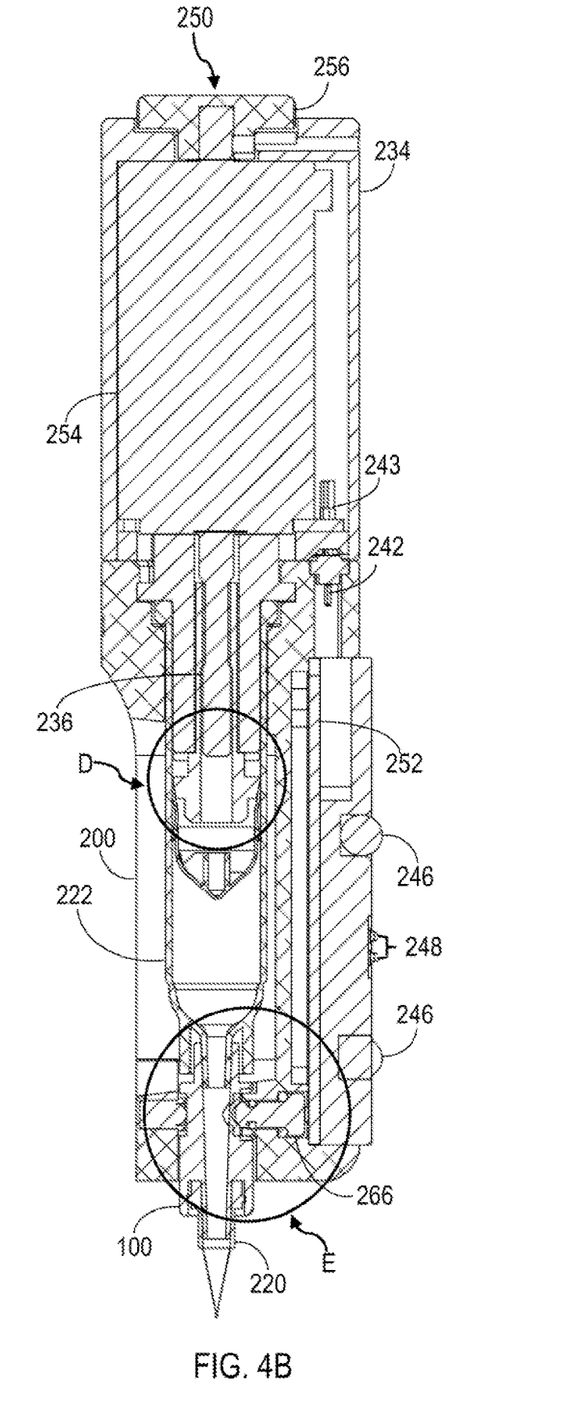
FIG. 4B is a cross-sectional view through section C-C of the print head shown in FIG. 3E.

Referring to FIGS. 4A and 4B illustrated therein is the print head 250, according to an embodiment. FIG. 4A is a ninety (90) degree counterclockwise rotated view of FIG. 3D. FIG. 4B is a side cross-section view through section C-C in FIG. 3E. The print head housing 200 includes a plurality of magnets 246 for attaching the print head 250 to a printer chassis (i.e. printer chassis 270 in FIG. 3F). The print head housing 200 includes electrical contact pins 248 for contacting complimentary pins on the printer chassis. The contact pins 248 connect to a microcontroller on a printed circuit board (PCB) 252 within the print head housing 200. The microcontroller relays drive signals to a stepper motor 254 in the dispensing control unit 234. The signals are relayed from the microcontroller to the stepper motor 254 via the electrical contact pins 242 on the print head housing 200 that connect to complimentary pins 243 on the dispensing control unit 234.

The stepper motor 254, is attached to the plunger 236 and drives the upward and downward movement of the plunger 236, and thus modulates the dispensing of material contained in the syringe 222 through the nozzle 220. The microcontroller is configured to detect the position of the plunger 236 during downward movement of the plunger 236. This positional information is interpreted by the microcontroller to give an indication of the fill level (i.e. how much material is left in the syringe 222). From a fully raised position, the microcontroller advances the plunger 236 by turning the stepper motor 254 until a pressure increase is detected. The fill level within the syringe 222 can be calculated by subtracting the empty volume of the syringe 222 (calculated from the syringe 222 diameter and the displacement of the plunger 236 prior to pressure increase) from the total volume of the syringe 222. The dispensing control unit 234 includes a knob 256 attached to the stepper motor 254 drive shaft. The knob 256 may be turned by a user to manually move the plunger 236 upward or downward.

Figure 4C:
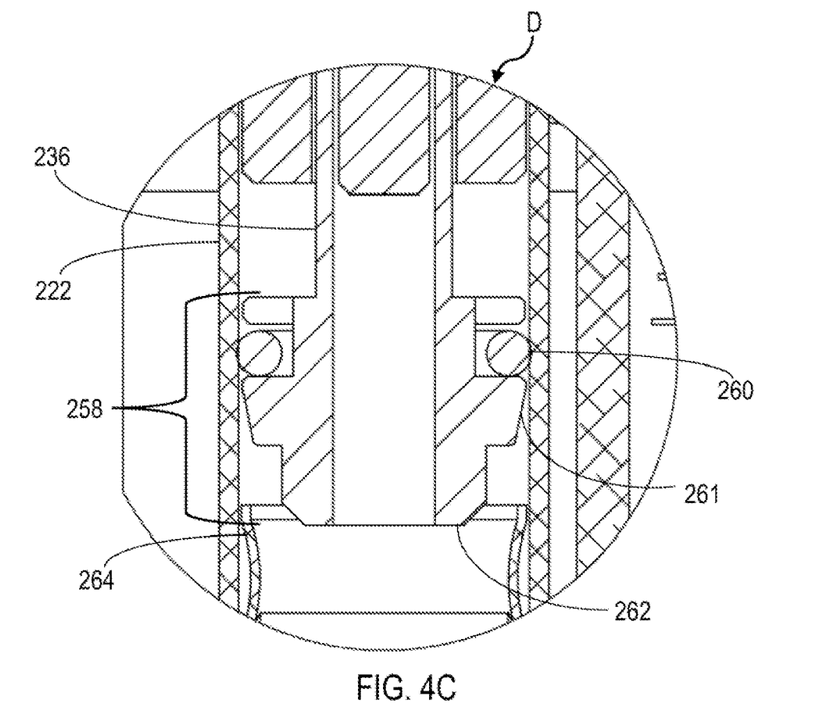
FIG. 4C is a magnified view of region D in FIG. 4B.

Referring to FIG. 4C, illustrated therein is a magnified view of region D in FIG. 4B showing the plunger 236 within the syringe 222. The plunger 236 includes a plunger head 258. The syringe 222 includes a piston 264. The piston 264 is pre-installed when the syringe 222 is filled with printable material. The piston 264 is positioned between the plunger head 258 and the material contained in the syringe 222. The advantage of this arrangement is that the plunger head 258 contacts the piston 264, rather than directly coming into contact with the material in the syringe 222 when the plunger 236 moves downward to dispense the material. Thus, the plunger 236 (and plunger head 258) do not require cleaning when the syringe 222 is replaced with another syringe 222 containing a different material. Furthermore, this allows for the use of syringes 222 that are pre-filled with printable material. The plunger head 258 includes a tapered end 262. When the plunger 236 moves downward to dispense material, the tapered end 262 directly contacts the top of the piston 264, which in turn moves downward. The tapered end 262 is shaped to exert outward force (in addition to downward force) on the piston 264, to prevent the piston 264 from flexing inward and potentially allowing material in the syringe 222 to leak upwards around the piston 264.

The plunger head 258 includes an O-ring 260 and a beveled flange 261. When the plunger 236 moves upwards in the syringe 222, the beveled flange 261 compresses the O-ring 260 against the wall of the syringe 222 to form a seal and ensure that no air flows around the plunger head 258. Consequently, when the plunger 236 moves upward, a vacuum is created in the space between the plunger head 258 and the piston 264. This in turn causes the piston 264 to travel upward creating pressure and a slight upward force in the syringe 222. Thus, the upward force in the syringe 222 caused by the upward movement of the plunger 236 can terminate the dispensing of material from the syringe 222. When the plunger 236 moves downward to dispense material from the syringe 222, the O-ring 260 seal is broken and air may move around the plunger head 258 enabling the plunger head 258 to move downward to contact the piston 264.

Figure 4D:
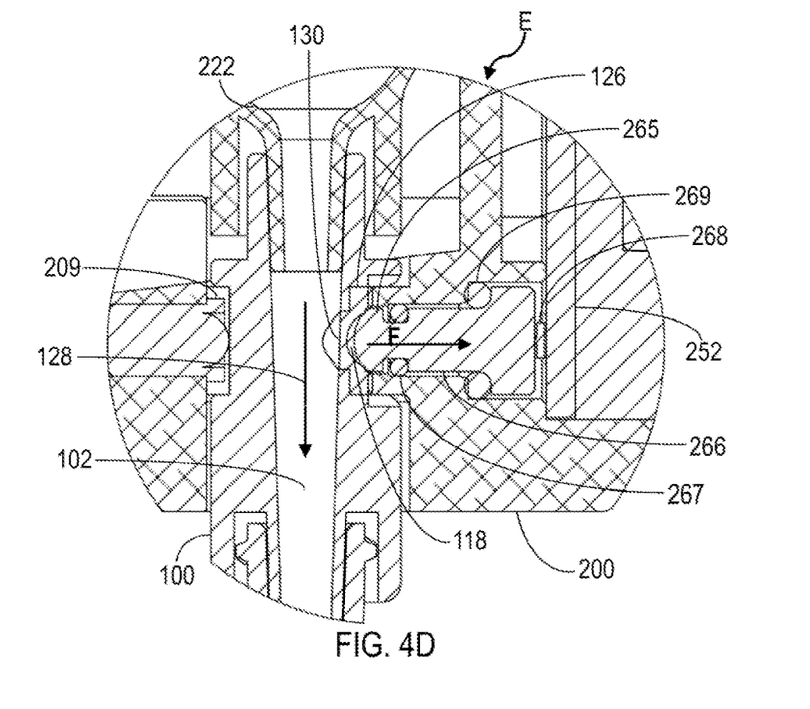
FIG. 4D is a magnified view of region E in FIG. 4B.

Referring to FIG. 4D, illustrated therein is a magnified view of Region E in FIG. 4B showing a pressure sensor 266 in relation to the pressure coupler 100 within the print head housing 200. The pressure sensor 266 includes a pressure sensing element 268 and a metal pin 265. The pressure sensing element 268 may be an Alps Electric HSFPAR003A sensor, or the like. The pressure sensing element 268 is on the PCB 252. The metal pin 265 is retained within the print head housing 200 between a compressed O-ring 269 and the pressure sensing element 268. The O-ring 269 ensures the pressure sensing element 268 and the metal pin 265 are always in contact such that a baseline pressure load felt by the pressure sensing element 268. The metal pin 265 is received into the dimple 118 and contacts the membrane 126 when the pressure coupler 100 is inserted into the print head housing 200. The pressure coupler 100 is held in place by ball spring 209 and an O-ring 267 ensures that the metal pin 265 is positioned correctly to properly contact the membrane 126 within the dimple 118.

Still referring to FIG. 4D, arrow 128 indicates the direction of material flow through the channel 102 during dispensing of material from the syringe 222. When printable material flows through the channel 102, the material exerts a force, F, on wall 130 of the channel 102 in a direction substantially perpendicular to the flow of material. The force, F, is the pressure exerted by the material as it flows through the channel 102. Generally, an increase in the rate of material flow corresponds to an increase in the pressure experienced by the material and a corresponding increase in the force F exerted on the wall 130 of the channel 102. The force, F, is also exerted on the membrane 126 that is contiguous with, and forms a portion of, the wall 130. As material flows through channel 102, the force, F, is transmitted through the membrane 126 to the metal pin 265 which in turn applies the Force, F, to the pressure sensing element 268 on the PCB 252. The pressure sensing element 268 records pressure measurements continuously in real-time while material is flowing through the channel 102. If the direction of material flow through is reversed (i.e. during termination of dispensing when there is backpressure in the channel 102), the corresponding change in the force, F, is measured by the pressure sensor 266 as a decrease in pressure.

Existing fluid pressure measurement systems can be difficult to clean due to narrow flow paths leading to residue build up and material contamination. Another problem is the pressure sensor can be damaged directly by chemical incompatibility with the fluid flowing through the system. Further, the cleaning process may damage the pressure sensor. A benefit of the present system is that the pressure sensor 266 is separable from the flow path of the fluid. Thus, if the flow path becomes clogged, the clogged component(s) can be replaced without having to replace the pressure sensor 266. For example, if the pressure coupler 100 becomes clogged by residue during printing, the clogged pressure coupler 100 can be easily switched for a fresh one without having to replace the pressure sensor 266 or any additional components. By decoupling the flow path from the pressure sensor 266, the relatively inexpensive flow path (i.e. the pressure coupler 100) can be disposable while the relatively expensive pressure sensor 266 can be reused without risking damage.

A further advantage is that the pressure sensor 266 is positioned to measure the pressure of the material as it is flowing through the pressure coupler 100, at a point that is close to the end of the flow path (i.e. the nozzle), as opposed to further upstream. This is particularly advantageous for using the pressure measurements in a feedback control loop to adjust the flow of thixotropic materials whose viscosity and flow rate vary with respect to an applied shear force.

Referring back to FIG. 4B, the pressure sensor 266 is connected to the PCB 252. As described above, the microcontroller on the PCB 252 is connected to the stepper motor 254 for controlling the output of stepper motor 254 to move the plunger 236 upward or downward thereby modulating dispensing of material contained in the syringe 222. Thus, the microcontroller may be configured to implement a feedback control-loop wherein displacement of the plunger 236 is compared with pressure measurements by the pressure sensor 266 to adjust or fine-tune the flow rate of material through the nozzle 220.

Figure 5:
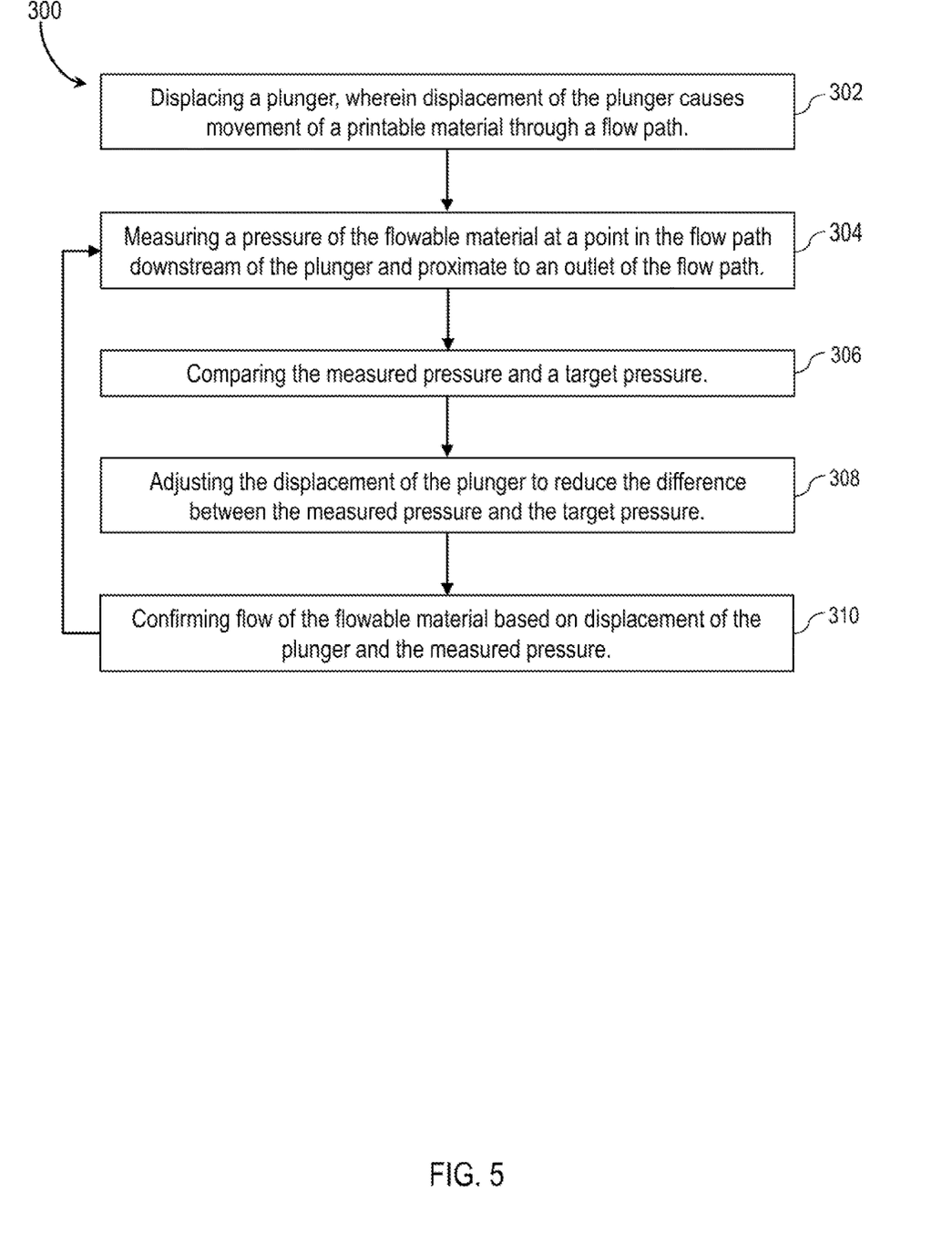
FIG. 5 is a flow chart of a method for continuous flow control of flowable material through a flow path, according to an embodiment.

Referring to FIG. 5, illustrated therein is a flow chart of a method 300 for continuous flow control of flowable material through a flow path, in accordance with an embodiment. The method 300 may be used for continuous fine-tuning of the flow of printable material, particularly thixotropic PCB materials during manufacturing of PCBs. Every printable material has different rheological properties and will therefore require different dispensing parameters depending on the application. Generating a parametric model that accurately represents the fluid flow behavior for all classes of materials is complicated and is the subject of future work. By measuring the pressure of the material close to the nozzle, one can avoid the complexities of a theatrical/idealized model and generate an empirical relationship between the measured pressure and resulting flow rate as determined by the displaced fluid volume required to maintain pressure. The method 300 may be performed by components of print head 250 shown in FIG. 4B. The elements from FIG. 4B are identified in parenthesis for reference.

At 302, a plunger (236) is displaced. The displacement of the plunger (236) is in a substantially vertical direction, either upward or downward. Displacement of the plunger (236) causes movement of a flowable material through a flow path. For example, downward displacement of the plunger (236) within a syringe (222) will cause a flowable material contained in the syringe (222) to be dispensed from the syringe (222) through a pressure coupler (100) and out of a nozzle (220). Upward displacement of the plunger (236) within the syringe (222) will cause termination of dispensing or, more generally, cause the flowable material to move from the nozzle (220) through the pressure coupler (100) and into the syringe (222). The flowable material may be conductive PTF paste, or another flowable PCB material.

The initial rate at which the plunger (236) is displaced may be set according to characteristics of the flowable material and the particular purpose for using the material. For example, if the flowable material is conductive PTF paste and the purpose is to deposit the paste onto a PCB to form conductive traces, then the initial rate of displacement of the plunger (236) will be determined by the compressibility and thixotropic properties of the PTF paste and the desired trace thickness. Thus, the initial rate at which the plunger (236) is displaced is correlated to an optimal (target) pressure for that particular purpose. The initial rate information may be stored by the microcontroller (252) which provides drive signals to a stepper motor (254) connected to the plunger (236) to displace the plunger (236) at the initial rate.

At 304, the pressure of the flowable material is measured at a point in the flow path that is downstream of the plunger (236) and proximate to an outlet of the flow path. "Downstream" refers to a point in the flow path is reached by the flowable material after being displaced by the plunger (236). For example, the flow path can be considered to start at plunger (236), progressing to the syringe (222), then to the pressure coupler (100), and ending at the nozzle (220) which is the outlet. In this case, the syringe (222), the pressure coupler (100) and nozzle (220) are downstream of the piston (236).

The pressure is measured by a pressure sensor (266) coupled to the pressure coupler (100). The pressure sensor (266) measures the flow pressure of the flowable material as it passes through the pressure coupler (100) and proximate to the outlet (i.e. the nozzle 220) of the flow path. For thixotropic materials, it is advantageous to measure the pressure of the flowing material as close as possible to the outlet, since it is at the outlet where shear forces are relaxed, causing a change in the viscosity and flow rate of the thixotropic material. Thus, the measured pressure near the outlet is more indicative of the actual flow rate of the thixotropic material exiting the nozzle (220), compared to a pressure that is measured further upstream of the nozzle (220).

At 306, the microcontroller (252) compares the pressure measured at Act 304, to a target pressure. The target pressure may be set according to characteristics of the flowable material and the particular purpose for which the material is being used. The microcontroller (252) receives the target pressure from a printer (i.e. the printer in which print head 250 is installed) via the electrical contacts (248) on the print head 250. The microcontroller (252) calculates a difference between the measured pressure and the target pressure.

At 308, the displacement of the plunger (236) is adjusted to reduce the difference between the measured pressure and the target pressure. If the target pressure is higher than the measured pressure, the microcontroller (252) advances the plunger (236) downward to increase pressure by turning the stepper motor (254). Conversely, if the target pressure is lower than the measured pressure, the plunger (236) is retraced thereby relieving pressure. However, the pressure of the printable material alone is insufficient to conclude that material is actually flowing through the print head (250). For example, a damaged or clogged nozzle (220) will prevent the material from flowing but will still allow the material to be pressurized and register a pressure measurement at Act 304.

At 310, the displacement of the plunger (236) is used to confirm flow of the printable material through the print head (250). The position of the plunger (236) is recorded by the microcontroller (252) during dispensing and used in conjunction with the pressure measurements to ensure material flow. For example, a constant plunger (236) position with a constant material pressure may indicate a clog or damaged nozzle. Alternatively, an advancing plunger (236) position with a constant material pressure is indicative of constant material flow.

Following Act 310, the method 300 reverts to Act 304 and proceeds in a loop thereafter. Acts 304, 306, 308 and 310 may be performed in real-time allowing for continuous monitoring and fine-tuning of the printable material flow.

While the above description provides examples of one or more apparatus, methods, or systems, it will be appreciated that other apparatus, methods, or systems may be within the scope of the claims as interpreted by one of skill in the art.

The invention claimed is:

1. A system for measuring a pressure of a material flowing through a channel for continuous feedback flow control, the system comprising:
    a pressure coupler comprising:
        a body having a first opening and a second opening;
        a channel spanning the first opening and the second opening, wherein the channel passes through a longitudinal center of the body;
        a membrane embedded in the body, wherein the membrane is contiguous with, and forms a region of, the channel passing through the body such that a material flowing through the channel imparts a force on the membrane in a substantially perpendicular direction to the direction of material flow; and
    a pressure sensor removable from the pressure coupler, the pressure sensor comprising:
        a pressure sensing element for sensing the force imparted on the membrane to measure the pressure of the material flowing through the channel in real-time, wherein the pressure sensing element is an electric sensor; and
        a pressure pin having opposable ends, wherein a first end of the pressure pin contacts the pressure sensing element and a second end of the pressure pin contacts the membrane, wherein the force imparted on the membrane is transferred to the pressure sensing element by the pressure pin.

2. The system of claim 1, wherein the pressure coupler further comprises a male Luer lock formed around the second opening.

3. The system of claim 1, wherein the membrane is constructed of an inert elastomer.

4. The system of claim 1, wherein a diameter at the first opening is larger than a diameter at the second opening.

5. The system of claim 1, wherein the body is constructed of either metal or plastic.

* * * * *